(12) United States Patent
Scott et al.

(10) Patent No.: US 8,848,174 B2
(45) Date of Patent: Sep. 30, 2014

(54) APPARATUS AND METHOD FOR COUPLING AN OPTICAL BEAM WITH AN OPTICAL FIBRE

(75) Inventors: Andrew M Scott, Malvern (GB); Andrew J Turner, Malvern (GB)

(73) Assignee: Qinetiq Limited, London (GB)

(*) Notice: Subject to any disclaimer, the term of this patent is extended or adjusted under 35 U.S.C. 154(b) by 1952 days.

(21) Appl. No.: 11/629,879

(22) PCT Filed: Jul. 7, 2005

(86) PCT No.: PCT/GB2005/002701
§ 371 (c)(1),
(2), (4) Date: Dec. 18, 2006

(87) PCT Pub. No.: WO2006/005928
PCT Pub. Date: Jan. 19, 2006

(65) Prior Publication Data
US 2008/0018896 A1 Jan. 24, 2008

(30) Foreign Application Priority Data
Jul. 8, 2004 (GB) .................................. 0415292.2

(51) Int. Cl.
*G01N 21/00* (2006.01)
*G02B 6/42* (2006.01)
(52) U.S. Cl.
CPC ...................................... *G02B 6/422* (2013.01)
USPC ............................................ 356/73.1; 385/13

(58) Field of Classification Search
USPC ......... 356/73.1, 124.5, 400, 35.5; 385/24, 52, 385/9–17, 25–33, 90–91; 398/10, 16–17, 398/156; 250/559.29, 559.3, 227.3, 559.33
See application file for complete search history.

(56) References Cited

U.S. PATENT DOCUMENTS

| | | | |
|---|---|---|---|
| 4,696,062 A * | 9/1987 | LaBudde | 398/156 |
| 5,463,215 A | 10/1995 | Alfille | |
| 5,477,323 A * | 12/1995 | Andrews et al. | 356/477 |
| 5,623,337 A | 4/1997 | Tori et al. | |
| 5,926,594 A * | 7/1999 | Song et al. | 385/49 |
| 6,480,651 B1 * | 11/2002 | Rabinski | 385/52 |

(Continued)

FOREIGN PATENT DOCUMENTS

| | | |
|---|---|---|
| EP | 0 432 912 A2 | 6/1991 |
| EP | 0 980 123 A2 | 2/2000 |

(Continued)

OTHER PUBLICATIONS

International Search Report of PCT/GB2005/002701, mailed Dec. 7, 2005.

(Continued)

*Primary Examiner* — Tarifur Chowdhury
*Assistant Examiner* — Michael P Lapage
(74) *Attorney, Agent, or Firm* — Nixon & Vanderhye P.C.

(57) ABSTRACT

A method and corresponding apparatus for coupling an optical beam into a first end of an optical fiber includes two steps. First, light is coupled into a second end of the optical fiber such that an optical reference beam is output from the first end of the optical fiber. Second, at least one beam parameter of the optical beam is matched with the corresponding beam parameter of the optical reference beam. The second step may be performed using a wavefront sensor.

25 Claims, 6 Drawing Sheets

(56) References Cited

U.S. PATENT DOCUMENTS

| | | |
|---|---|---|
| 6,485,413 B1 * | 11/2002 | Boppart et al. ............... 600/160 |
| 2003/0053071 A1 * | 3/2003 | James et al. ................. 356/491 |
| 2004/0027631 A1 * | 2/2004 | Nagano et al. ............... 359/196 |
| 2004/0223715 A1 * | 11/2004 | Benoit et al. ................. 385/123 |
| 2005/0135815 A1 | 6/2005 | Gerwe et al. |

FOREIGN PATENT DOCUMENTS

| | | |
|---|---|---|
| EP | 1 041 686 A2 | 10/2000 |
| GB | 2 223 328 A | 4/1990 |
| WO | 99/46768 A | 9/1999 |

OTHER PUBLICATIONS

GB Search Report of GB0415292.2, dated Sep. 30, 2004.

Su et al., "Beam delivery by large-core fibers: effect of launching conditions on near-field output profile", Applied Optics USA, vol. 31, No. 27, Sep. 20, 1992, pp. 5816-5821, XP002353557.

Gonte et al., "Optimization of single-mode fiber coupling efficiency with an adaptive membrane mirror", Optical Engineering SPIE USA, vol. 41, No. 5, May 2002, pp. 1073-1076, XP002353523.

Shaklan et al., "Coupling starlight into single-mode fiber optics", Applied Optics USA, vol. 27, No. 11, Jun. 1, 1988, pp. 2334-2338, XP002353524.

Kotrotsios et al., "Multipoint Operation of Two-Mode FMCW Distributed Fiber-Optic Sensor", Journal of Lightwave Technology, IEEE Service Center, vol. 8, No. 7, Jul. 1, 1990, pp. 1073-1077, XP000171596.

Wegmuller et al., "Evolution of the beam diameter in a multimode fiber link through offset connectors", IEEE Photonics Technology Letters IEEE USA, vol. 13, No. 6, Jun. 2001, pp. 574-576, XP002353558.

Bock et al., "Hydrostatic pressure effects on mode propagation in highly birefringent two-mode bow-tie fibers", Optics Letters USA, vol. 15, No. 24, Dec. 15, 1990, pp. 1434-1436, XP002353559.

Boechat et al., "Dependence of output near-field beam profile on launching conditions in graded-index fibers used in delivery systems for Nd:YAG lasers", Applied Optics USA, vol. 32, No. 3, Jan. 20, 1993, pp. 291-297, XP002353560.

* cited by examiner

APPARATUS AND METHOD FOR COUPLING AN OPTICAL BEAM WITH AN OPTICAL FIBRE

This application is the U.S. national phase of international application PCT/GB2005/002701,filed 7 Jul. 2005, which designated the U.S. and claims priority of GB 0415292.2, filed 8 Jul. 2004, the entire contents of each of which are hereby incorporated by reference.

The present invention relates to a laser beam handling system and more particularly to an apparatus and method for aligning an optical fibre with respect to a high power laser.

The development of high power laser systems has led to a requirement to be able to couple high power laser light into small core optical fibres such as photonic crystal fibres. If the high power laser light misses the central core of the optical fibre and becomes incident on the cladding of the fibre it can cause catastrophic damage. Typically, known coupling systems comprise focusing optics with a manual micrometer adjustment means for optimising alignment of the fibre with respect to the high power laser beam. Techniques that use a camera to view the end of the fibre into which the optical beam is being injected are also known; e.g. see EP432912. However, such prior art techniques are time consuming, often require a skilled technician and can be quite unreliable.

In a completely unrelated technical field, wavefront sensors are also known. Previously such sensors have been used to characterise the shape of optical surfaces. The following publications provide details of various wavefront sensors:
(a) Woods, S., Greenaway, A. H., Wave-front sensing by use of a Green's function solution to the intensity transport equation, *J. Opt. Soc. Am. A,* 20(3) 508-512 (2003)
(b) Burnett, J. G., Woods, S., Turner, A., Scott, A. M., Wave-front measurement over an extended horizontal path using a wavefront curvature sensor, To be published in the Proceedings of the 4th International Workshop on Adaptive Optics for Industry and Medicine, Muenster, Germany, October 2003
(c) Scott, A. M., Woods, S., Single shot measurement of the laser beam quality parameter $M^2$ using IMP gratings, SPE Proc. 4629 *Laser Resonators and Beam Control V*, Alexis V. Kudryashov (ed.) San Jose, 22-23 Jan. 2002
(d) Blanchard, P. M., Fisher, D. J., Woods, S., Greenaway, A. H., Phase-diversity wave-front sensing with a distorted diffraction grating, *Applied Optics* 39(35) 6649-6655 (2000)
(e) Blanchard P. M., Greenaway A. H., Broadband simultaneous multiplane imaging, *Opt. Comm.*, 183, 29-36 (2000)
(f) Blanchard, P. M., Greenaway, A. H., Simultaneous multiplane imaging with a distorted diffraction grating, *Applied Optics* 38(32) 6692-6699 (1999)
(g) Blanchard P. M., Burnett J. G., Erry G. R., Fisher D. J., Greenaway A. H., Harrison P., Woods, S., Measurements of low-level atmospheric turbulence. In: A Kohnle, J D Gonglewski (eds.). *Optics in Atmospheric Propagation and Adaptive Systems III*. 1999, Proc. SPIE 3866, 135-142.
(h) Blanchard P. M., Burnett J. G., Erry G. R. G., Greenaway A. H., Harrison P., Harvey A., Woods S., Optical propagation through low-level turbulence. In: A D Devir, A Kohle, U Schreiber, C Werner (eds.). *Atmospheric propagation, Adaptive Systems and Lidar techniques for Remote Sensing II*. Proc. SPE 3494, 1998, 104-110.
(i) International patent application WO 99/46768.

It is an object of the present invention to provide an improved apparatus and method for coupling a laser beam into an optical fibre.

According to a first aspect of the present invention, a method of coupling a first optical beam into the first end of an optical fibre comprises the steps of (i) coupling light into the second end of the optical fibre such that an optical reference beam is output from the first end of the optical fibre and (ii) matching at least one beam parameter of the first optical beam with the corresponding beam parameter of the optical reference beam.

The present invention thus involves passing light from a reference light source (e.g. a low power laser) along the optical fibre in the opposite direction to the first optical beam. After passing through the optical fibre, the reference beam output from the first end of the optical fibre has a beam shape that is conjugate to the optimum shape of the first optical beam. In other words, the characteristics of the optical reference beam that is output from the first end of the optical fibre provides an indication of the ideal characteristics of the first optical beam; i.e. the characteristics that would be required to maximise the coupling efficiency of the first optical beam into the optical fibre. Matching at least one beam parameter of the first optical beam with the corresponding beam parameter of the reference beam can thus be seen to provide a convenient way to increase the optical efficiency with which a laser beam can be coupled into an optical fibre.

It should be noted that the efficiency with which light is coupled into the second end of the optical fibre is not critical as only a fraction of the lower power beam needs to be coupled into the fibre. However, it is preferable that the majority of the light forming the optical reference beam has propagated along the core of the optical fibre and that any light that has not coupled into fibre core is lost before it reaches the first end of the fibre. The losses associated with light propagation in the fibre cladding could be increased if required by, for example, bending the optical fibre.

Advantageously, the step of (ii) matching at least one beam parameter of the first optical beam with the corresponding beam parameter of the optical reference beam comprises the step of using a beam characterisation sensor to measure at least one beam parameter of the optical reference beam.

Preferably, the step of (ii) matching at least one beam parameter of the first optical beam with the corresponding beam parameter of the optical reference beam comprises the step of using a beam characterisation sensor to measure at least one beam parameter of the first optical beam.

Conveniently, a common beam characterisation sensor is used to measure at least one beam parameter of the first optical beam and at least one beam parameter of the optical reference beam.

The step of using a beam characterisation sensor may comprise the step of using a wavefront sensor. A wavefront sensor is advantageous because it can provide accurate information on many wavefront properties such as tilt angle, misalignment and beam curvature. The wavefront sensor can also be used to provide beam waist information. Alternatively, if less accurate alignment of the first optical beam to the optical fibre is required, the sensor may comprise a standard two dimensional imaging array. A number of suitable wavefront sensors have been described previously and various references to publications describing such sensors are listed above. The content of the above mentioned references is hereby incorporated herein by reference. Other wavefront sensors, such as the well known Shack-Hartmann wavefront sensor, could also be used.

The step of (ii) matching at least one beam parameter of the first optical beam with the corresponding beam parameter of the optical reference beam may comprise the step of matching the tip/tilt of the first optical beam with the tip/tilt of the reference beam. The tip/tilt of a beam is a term well known to those skilled in the art. In short, the first optical beam is arranged to impinge on the first end of the optical fibre from the same angle that the reference beam propagates away from the first end of the optical fibre.

The step of (ii) matching at least one beam parameter of the first optical beam with the corresponding beam parameter of the optical reference beam may comprise the step of laterally aligning the first optical beam with the reference beam. The first optical beam is thus arranged to intersect the plane containing the first end of the optical fibre at the same position as the reference beam.

The step of laterally aligning the first optical beam with the reference beam advantageously comprises laterally displacing the first end of the optical fibre relative to the first optical beam. Moving the first end of the optical fibre relative to the first optical beam provides a convenient way of altering the lateral displacement of the first optical beam relative to the first end of the optical fibre. Alternatively, the laser source providing the first optical beam could be adjusted relative to the first end of the optical fibre.

Advantageously, the step of (ii) matching at least one beam parameter of the first optical beam with the corresponding beam parameter of the optical reference beam comprises the step of matching the focus of the first optical beam with the focus of the reference beam. In other words, the first optical beam is arranged to have its focus in substantially the same plane as the reference beam.

Furthermore, the step of (ii) matching at least one beam parameter of the first optical beam with the corresponding beam parameter of the optical reference beam may comprise the step of matching the beam curvature of the first optical beam to the beam curvature of the reference beam. The "beam curvature" is a well known term to those skilled in the art of lasers. In this case, the angle of convergence of the first optical beam on the first end of the optical fibre would be matched to the angle of divergence of the reference beam that exits the optical fibre.

Conveniently, the step of (ii) matching at least one beam parameter of the first optical beam with the corresponding beam parameter of the optical reference beam comprises the step of matching the beam waist of the first optical beam with the beam waist of the optical reference beam. The beam waist, or $2\omega_0$, is a well known property of a laser beam. Typically, the beam waist required would be around 70% of the diameter of the optical fibre core.

The method of the present invention may involve matching any one or more of the tip/tilt, lateral alignment, focus, beam curvature or beam waist of the first optical beam with the optical reference beam. However, various factors (e.g. fibre core diameter) will influence how critical it is to accurately match that particular beam parameter in a particular optical system. The skilled person would therefore select which beam parameter or parameters of the first optical beam should be matched to those of the optical reference beam based on the precise design of the optical apparatus.

A computer program may also be provided to analyse data acquired from the wavefront sensor. Furthermore, the computer program may be arranged to control various components of the optical system thereby implementing the step of matching at least one beam parameter of the first optical beam with the corresponding beam parameter of the optical reference beam. For example, a computer program may analyse data provided by a wavefront sensor that relates to the beam properties of the optical reference beam and the first optical beam. The location of the first end of the optical fibre may then be moved in relation to the first optical beam to minimise lateral misalignment of the reference beam and the first optical beam.

The alignment method may be used whilst the first optical beam is being transmitted through the optical fibre and/or the method may be used prior to activation of the first optical beam. In other words, the alignment method could be used during device calibration (e.g. during initial alignment of optical components), periodically (e.g. at system start-up), and/or continuously (e.g. to continually maximise coupling efficiency during use).

It should also be noted that step (ii) could be performed in two stages; e.g. step (a) of measuring the beam parameters of the optical reference beam and step (b) of adjusting at least one beam parameter of the first optical beam. There may, in certain circumstances, be a delay between performing steps (a) and (b). For example, the beam parameters of the optical reference beam could be measured and stored for subsequent use in optimising the at least one beam parameter of the first optical beam.

According to a further aspect of the invention, optical apparatus is provided for coupling a first optical beam into the first end of an optical fibre and is characterised in that the apparatus comprises means for coupling light into the second end of the optical fibre such that an optical reference beam will be output from the first end of the optical fibre, wherein beam matching means are provided for matching at least one beam parameter of the first optical beam with the corresponding beam parameter of the optical reference beam.

Preferably, the beam matching means comprise a beam characterisation sensor such as a wavefront sensor. The wavefront sensor may comprise at least one of a distorted grating, a lens and a detector array. In addition, the apparatus may further comprise relay optics that are arranged to direct the reference beam and a proportion of the first optical beam to the beam characterisation sensor. Advantageously, the relay optics may comprise a beam splitter and a retro-reflector. This arrangement allows a few percent of the first optical beam to be directed to the sensor whilst the majority of the beam power is directed to the first end of the optical fibre.

Conveniently, the optical fibre may be a photonic crystal fibre. However, it should be noted that the present invention could be used to align any type of optical fibre.

According to a further aspect of the invention, an optical apparatus comprises a primary laser source for producing a first optical beam and alignment means for aligning the first end of an optical fibre with the first optical beam, characterised in that the alignment means comprises at least one wavefront sensor.

Optical apparatus is thus provided in which alignment means are arranged to align a first optical beam with an optical fibre using a wavefront sensor. The wavefront sensor provides a measurement of the wavefront shape of the first optical beam and such beam shape data may be used to aid alignment of the core of the optical fibre with the first optical beam produced by the laser source. In other words, characteristic properties of the first optical beam are measured and used when aligning the first optical beam with the optical fibre. Apparatus of the this type enables an optical beam to be aligned with the core of an optical fibre with a much greater degree of accuracy than the manual adjustment techniques of the prior art.

Conveniently, the apparatus further comprises an optical fibre, the alignment means being arranged to align the first end of said optical fibre with respect to the optical beam.

Preferably, the alignment means further comprises a second laser source for outputting an optical reference beam, wherein, in use, said reference beam is optically coupled into the second end of the optical fibre. In such a case, the apparatus may be arranged such that the wavefront sensor is arranged to receive the reference beam when output from the first end of the optical fibre.

In this manner, the shape of the reference beam output from the first end of the optical fibre and/or the shape of the primary optical beam can be measured by the wavefront sensor as required. In other words, the apparatus allows one or both of the first optical beam and the reference beam to be routed to the wavefront sensor. As described above, the first optical beam and the reference beam can be passed to the wavefront sensor via a beam splitter arrangement. This allows the reference beam and the first optical beam to fall on the same wavefront sensing means. Coarse alignment of the first optical beam and the reference beam can be provided by ensuring an overlap of the zero order modes.

It should be noted that whilst a single wavefront sensor is preferred, separate wavefront sensors may be provided to separately detect the first optical beam and the optical reference beam.

Advantageously, the alignment means is arranged to alter the position of the first end of the optical fibre relative to the first optical beam so as to superposition the reference beam and the primary optical beam. For example, the alignment means may comprise a translation stage for translating the position of the first end of the optical fibre relative to the first optical beam.

The alignment means may also comprise a moveable stage for altering the angular alignment of the first end of the optical fibre relative to optical axis of the first optical beam (e.g. to match tip/tilt). The moveable stage may also be arranged to translate the position of the first end of the optical fibre relative to the first optical beam.

In addition, beam shaping means (e.g. beam shaping optics) may additionally be provided for altering the beam shape of the first optical beam. In other words, means are provide to alter the shape of the first optical beam. Altering the shape of the first optical beam (e.g. changing the beam waist or curvature) further improves the efficiency with which light can be coupled into the first optical fibre.

Conveniently, the primary laser source is a high power laser source. Preventing misalignment of such a high power source prevents damage to the optical fibre.

An optical apparatus is also described that comprises a laser source, an optical fibre having a first end arranged to receive a first optical beam output by the laser source and beam adjustment means to alter the shape of the wavefront of said first optical beam at the first end of the optical fibre, characterised in that the apparatus further comprises at least one wavefront sensor to measure the shape of the wavefront of the first optical beam.

Apparatus for aligning an optical system that comprises a primary laser source arranged to couple a first optical beam into the first end of an optical fibre is also described. The apparatus comprises a wavefront sensor that, when attached to said optical system, can measure the beam characteristics of the first optical beam.

In other words, an optical system could be provided which is aligned using apparatus comprising a wavefront sensor that is attached to said optical system and measures the beam characteristics of the primary laser source. After alignment, the apparatus could be detached from the optical system.

Conveniently, the optical system is arranged to feed radiation into the second end of the optical fibre such that an optical reference beam is output from the second end of the optical fibre wherein the wavefront sensor can, when attached to said optical system, measure the beam characteristics of the optical reference beam. In this manner, the beam parameters of the optical reference beam can be compared to those of the first optical beam in the manner described above.

Furthermore, wavefront sensing apparatus is described that comprises a wavefront sensor, a beam splitter and a retro-reflector wherein the apparatus is arranged such that two optical beams can be simultaneously directed to the wavefront sensor.

The invention will now be described, by way of example only, with reference to the following drawings in which.

Figure 1:
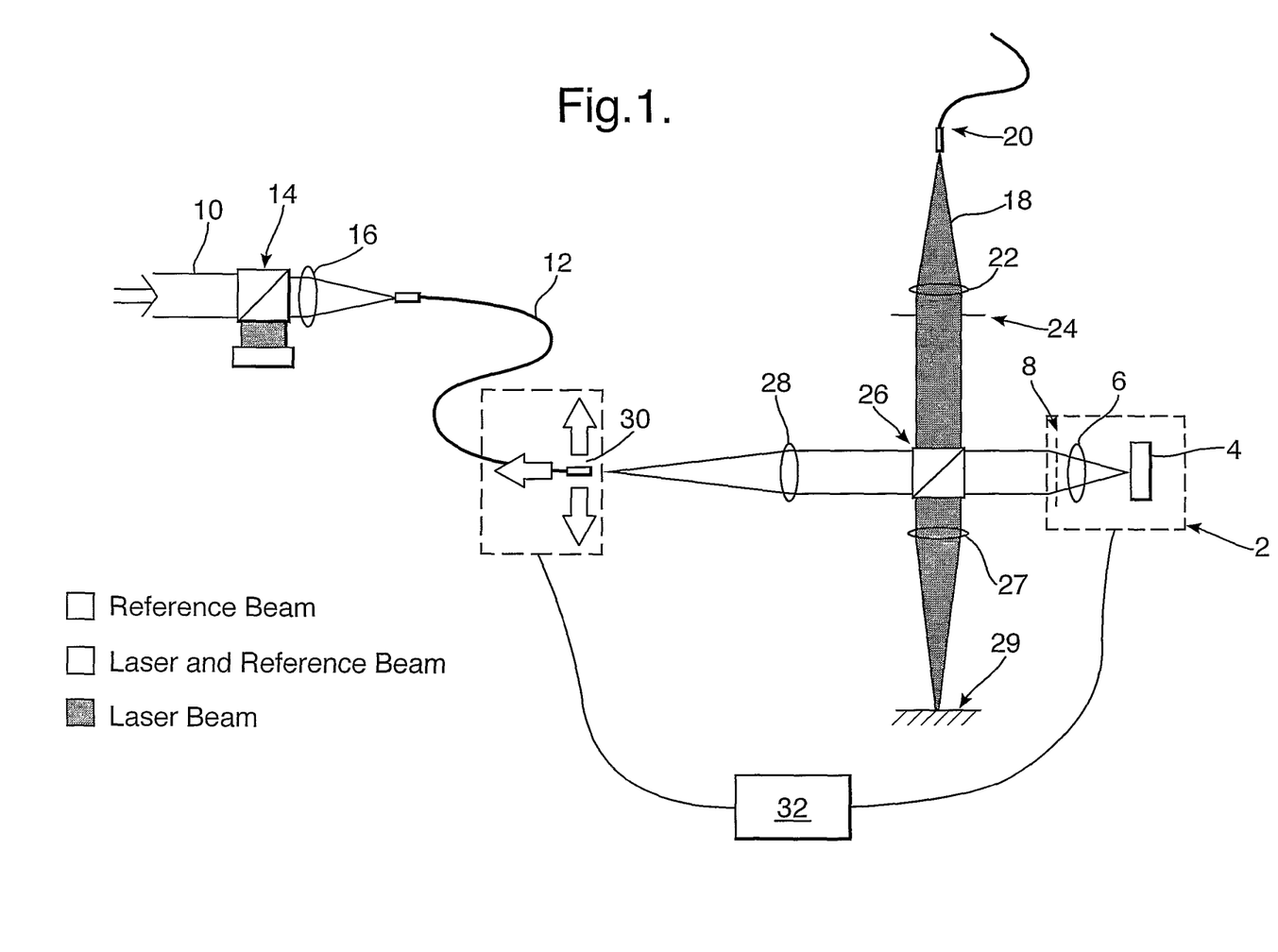
FIG. 1 illustrates the layout of an optical system of the present invention.

Referring to FIG. 1, an optical apparatus of the present invention is shown. The apparatus comprises a wavefront curvature sensor or camera 2 of the type described previously in the various publications listed above.

The wavefront camera 2 comprises a detector array 4, a conventional lens 6 and a distorted phase grating 8 which acts as an off-axis Fresnel lens. Alternatively, two orthogonal gratings with different focal lengths could be used in place of the lens 6 and grating 8.

The wavefront camera 2 can measure the diameter and curvature of an incident beam. Using the form of processing described previously, the wavefront sensor 2 is able to measure the diameter of a beam at nine planes simultaneously and can thereby determine the Gaussian beam parameters of an incident beam instantaneously.

Light incident on the camera 2 is first diffracted by the off-axis Fresnel zone plate (i.e. the distorted grating 8). The grating 8 diffracts light into the −1, 0 and +1 orders, with an efficiency that depends on the depth of the phase grating. The zero order light passes through without modification, but the +1 and −1 orders experience focusing corresponding to focal lengths $+f_g$ and $-f_g$ respectively. The diffracted light is further focused by the camera's conventional lens 6 and directed onto the detector array 4 at the focal plane of the conventional lens 6.

When a collimated beam is directed onto the camera 2, the three diffracted orders each produce an image corresponding to a different focal length, and the images on the focal plane of the camera correspond to an image of the waist for the zero order, and defocused images for the +1 and −1 orders respectively. By measuring the diameters of the three images it is possible to derive an estimate of the position and diameter of the beam waist and an estimate of the beam divergence.

The concept can be taken further by placing two gratings of different effective focal length orthogonal to each other in front of the conventional lens. In this case one generates an array of 3×3 images corresponding to the image of the beam at nine different planes. These nine images can be used to accurately measure the focal spot diameter, location and beam divergence, leading to a measure of $M^2$. As would be well known to those skilled in the art, $M^2$ provides a measure of the beam quality.

It should be noted that the combination of a distorted grating and a conventional camera could alternatively be used as the wavefront curvature sensor. This involves a different way of processing the recorded data. The two diffracted orders can be related to the image of the incident beams at two separated planes, and it has been shown that one can process these two images to determine the wavefront curvature. It has been shown previously (for example see the Woods and Greenaway publication listed above) that such data can be processed and, using a Greens function algorithm, two images can be recorded from which it is possible to determine the shape of the wavefront over a 40×40 spatial array. The wavefront can then be analysed in terms of Zernike modes to determine the degree of distortion, identifying features such as astigmatism, spherical aberration and coma.

The wavefront curvature sensor described above has previously been used to measure the shape of optical surfaces. This was done by shining a collimated beam onto a reflecting surface to be measured, and measuring the shape of the wavefront of the reflected light.

In use, apparatus of the present invention causes a low power reference beam 10 to be directed into the output end of an optical fibre 12 via a beam splitter 14 and a lens 16. The alignment of the reference beam 10 with respect to the optical fibre 12 does not need to be critical as long as enough power is coupled into the fibre to enable measurements from the wavefront sensor at the high power input end.

A laser source 20 provides a high power laser beam 18 that is passed through a lens 22 and an aperture 24 to a second beam-splitter 26. The second beam-splitter 26 directs most of the high power laser beam towards the input end of the fibre 12 via a lens 28. The input end of the optical fibre 12 is mounted on an X-Y-Z encoder feedback stage 30.

A small percentage of the high power beam 18 is picked off using the second beam splitter 26 and is reflected back through to the wavefront sensor 2 via the lens 27 and the mirror 29. The relay optics (i.e. lenses 22, 29 etc) ensure that the aperture of the high power laser beam (the pupil plane) is relay-imaged onto the distorted diffraction grating. The wavefront characteristics (tip, tilt, defocus) of the high power laser beam 18 and the reference beam 10 are measured by the wavefront sensor 2 and the two are compared. Moving the input end of the optical fibre 12 by adjusting the X-Y-Z encoder feedback stage 30 is used to change the characteristics of the reference beam at the wavefront sensor 2. The X-Y-Z encoder feedback stage 30 is moved until the reference and high power beams are aligned; i.e. until the high power beam matches the reference. The way in which such an adjustment is performed is described in more detail below.

Apparatus of the present invention thus employs the concept of directing a reference beam down a fibre from the "output" end, with non-optimum alignment, but with sufficient power to be analysed when it emerges from the "input" end. The light will emerge from the input end with the precise Gaussian beam parameters that one wishes to produce on the beam which is to be coupled into the fibre. Using the wavefront sensor, one can determine the position (both transverse and longitudinal) and the diameter of the emerging beam. A beamsplitter and separate optical path is used to enable the wavefront sensor to determine the parameters of the actual input beam, without changing the optical alignment. One can therefore use the sensor to adjust the input beam until it matches the parameters of the emerging reference beam, and at that point the input beam will be well-matched to the fibre.

It should be noted that the specific system described herein uses a wavefront sensor to measure only the curvature and the tip-tilt of the emerging wavefront. This allows the longitudinal and transverse position of the fibre to be adjusted to ensure that the intended input beam couples in with maximum efficiency. In particular, it should be noted that the diameter of the beam waist has not been determined and so the described system does not offer complete mode matching. However, the wavefront sensor can be readily arranged to make such measurements and a system that provides complete mode matching by also modifying the focusing optics of the intended input beam could be provided.

A computer 32 is provided to control the X-Y-Z encoder feedback stage 30 in response to measurements acquired by the wavefront sensor 2. The computer runs control software that carries out the alignment process in a number of step.

Firstly, a coarse alignment step is undertaken. This step allows the different characteristics of the two beams (i.e. the high power and reference beams) to be measured before the wavefronts are be compared. This step involves determining the location of the zero orders of the reference and high power beams. A simple translation is then performed to superpose the reference beam and the high power beam. In other words, the stage 30 is adjusted to co-locate the zero orders of the high power and reference beam at the wavefront sensor.

Secondly, the reference beam is shuttered off and a wavefront measurement is calculated from the high power laser beam. The tip and tilt results from this measurement are used to null the system so that any further measurements are relative to the high power wavefront. It should be noted that the defocus measurement of this step needs to be matched with the opposite sense as a diverging high power beam is equivalent to a converging reference beam.

Thirdly, the high power beam is shuttered off and the reference beam is enabled. A measurement is taken of the reference wavefront which will differ from the characteristics of the high power laser beam. Measurement of the wavefront properties tip and tilt means an accurate translation of the fibre end in the X-Y axes can be obtained. Similarly, the defocus measurement enables fibre end to be translated in the Z axis can to give the required (i.e. opposite) focusing.

Referring now to FIGS. 2 to 5, a typical alignment process is illustrated. As noted above, the alignment process consists of a coarse alignment followed by a wavefront measurement and correction.

Figure 2:
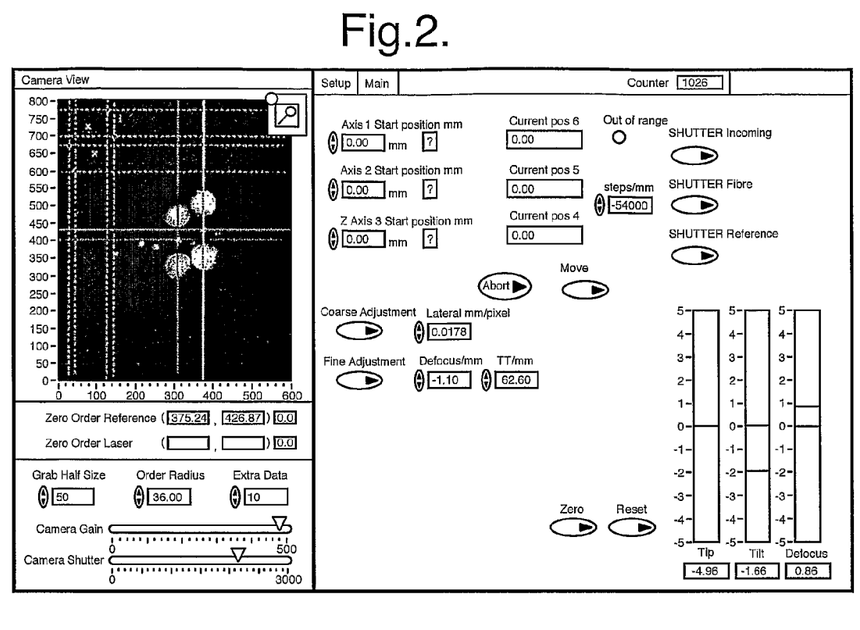
FIG. 2 shows an image of the zero orders of the reference and high power beams.

FIG. 2 shows a frame captured from the control software of apparatus of the present invention. The zero order beams of the reference beam and the high power beam are pinpointed and the difference in location of the two beams is calculated. Note that the angular mis-alignment of the reference beam causes an off axis intensity in the +/−1 orders. The calculated difference value is then converted to a spatial difference and the translation stage is activated to move the end of the optical fibre so that the two beams are superpositioned.

Figure 3:
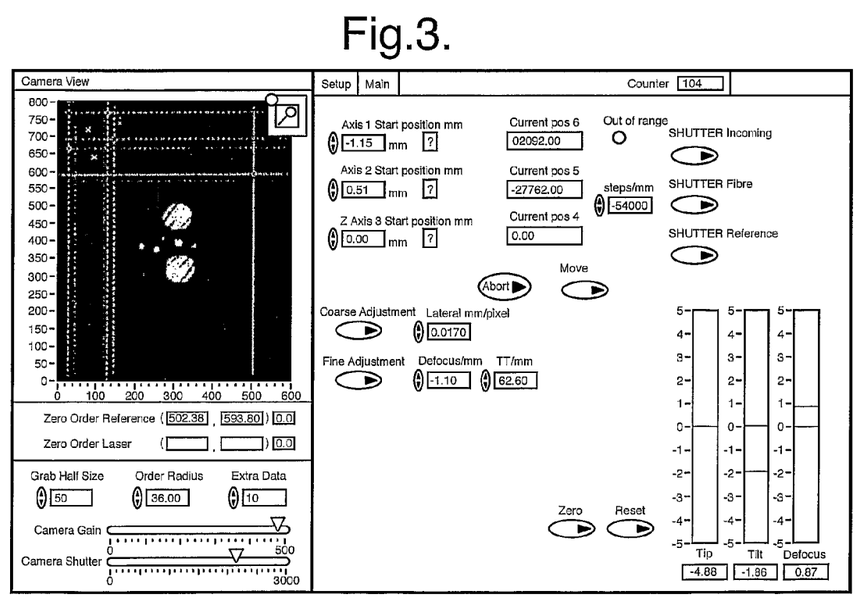
FIG. 3 shows an image of the reference and high power beams after coarse alignment.

FIG. 3 show the coarse alignment of the two orders. Note that the coarse alignment produces interference in the orders because the two beams used in this example were coupled from the same HeNe laser source. In any case, the interference effects would not affect any measurements as the two beams are not analysed at the same time.

Figure 4:
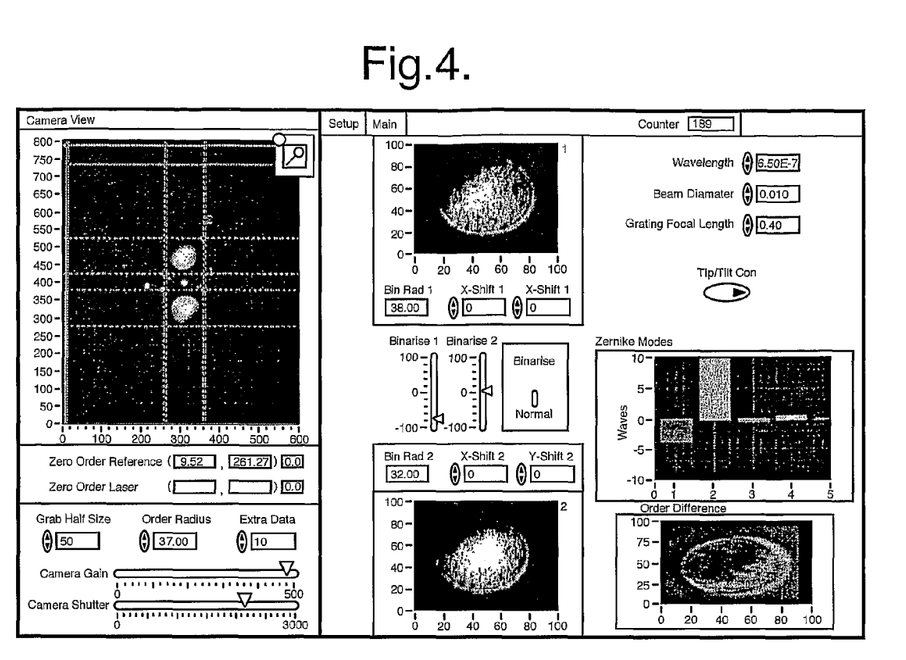
FIG. 4 shows the high power beam wavefront measurement.

The reference beam is then shuttered, and a wavefront measurement is performed on just the high power laser beam. FIG. 4 shows an image of the high power beam from which the tip/tilt and defocus properties of the beam are calculated.

Other modes such as coma, which can appear as tip or tilt, are also measured and a general beam quality measurement can be obtained at the same time. The software is then reset so that the tip/tilt values associated with the high power beam are zeroed.

Finally, the high power beam is shuttered off. The reference beam characteristics are then measured whilst the feedback loop varies the alignment of the end of the optical fibre so that it matches the high power alignment. As the tip/tilt values of the high power beam were zeroed, the feedback loop operates as a null system. In other words, the wavefront properties of the reference beam are altered by moving the end of the optical fibre so that they match the properties of the high power laser beam. It should be noted that in the case of defocus, a converging high power beam would need to be a diverging reference beam.

Figure 5:
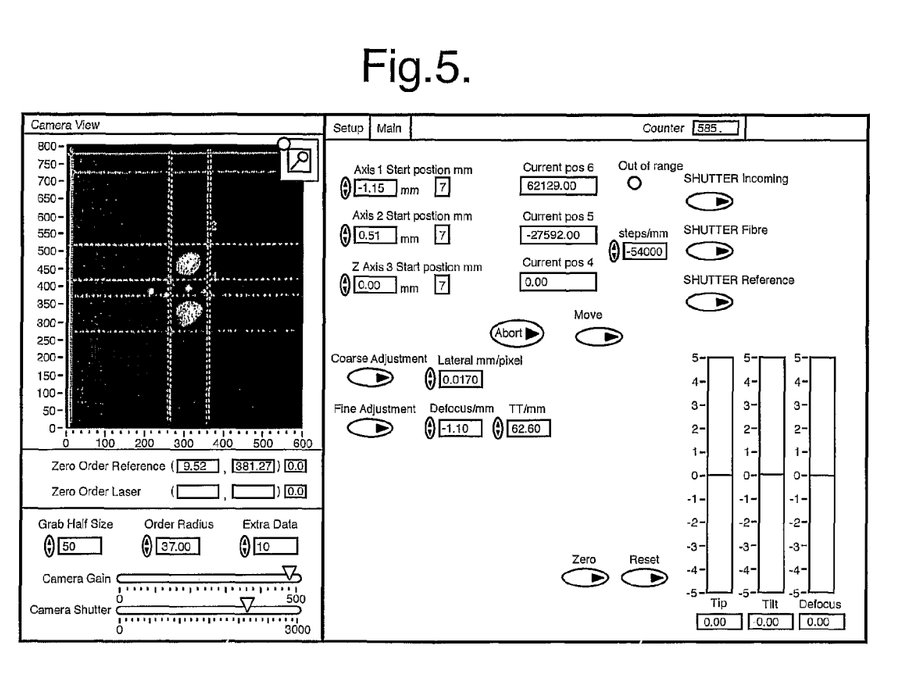
FIG. 5 shows the reference beam when its wavefront properties have been matched to the high power beam.

FIG. 5 shows a matched reference beam that has been aligned so that the tip/tilt is minimised (i.e. equivalent to the tip/tilt of the high power beam) and the defocus (in this case zero) is in the opposite sense.

Figure 6:
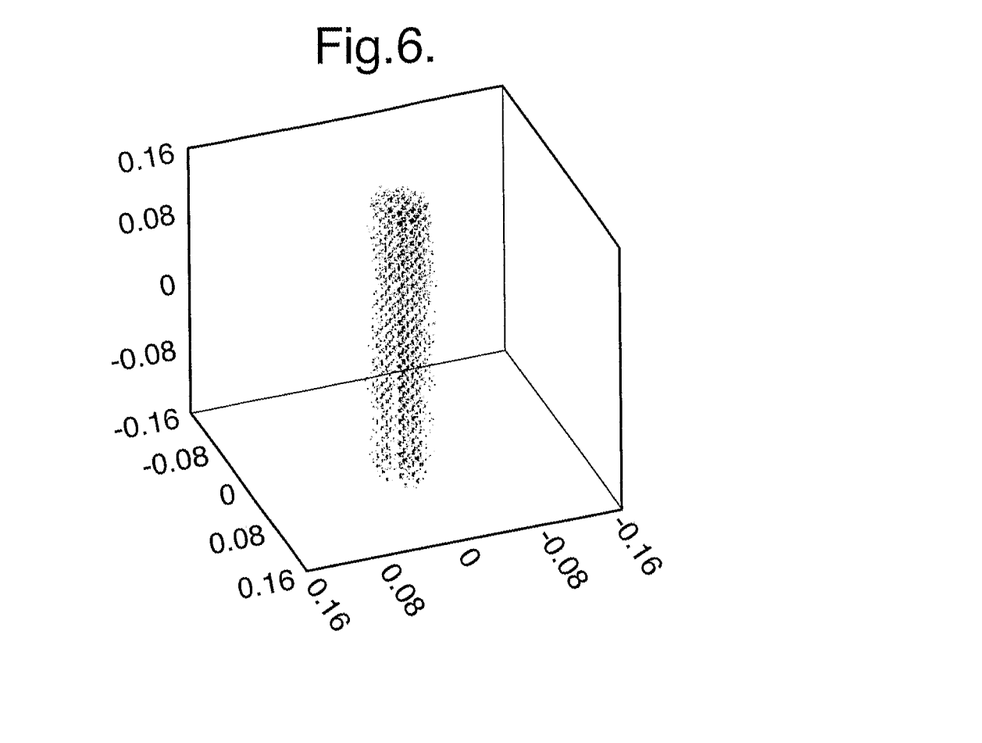
FIG. 6 shows a three dimensional plot of a scanned fibre end.
Figure 7:
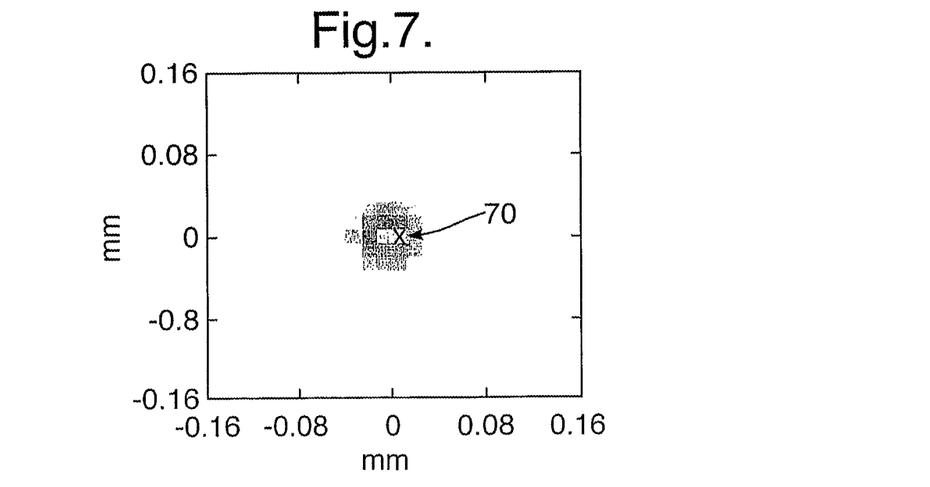
FIG. 7 shows a cross-sectional image through the x-y plane at z=0 of the data shown in FIG. 6.

Referring to FIGS. 6 and 7, a method for gauging the effectiveness of the alignment technique described above with reference to FIGS. 1 to 5 is outlined.

The method comprises measuring how efficiently the high power beam couples into the optical fibre as the input end of the optical fibre is scanned in three dimensions around the focus of the coupling lens. The intensity at the output end of the fibre then changes when the input end is scanned through the waist of the high power beam. It was assumed that the best coupling would result in the maximum output intensity. By comparing the co-ordinates of the highest intensity and the WFS alignment, the effectiveness of the system can be ascertained.

FIG. 6 shows an example scan that was taken over a small volume (dimensions 0.16 mm) to achieve a quick high resolution intensity distribution. The intensity at the output end of the fibre was measured using a photodiode at each point in the scan. The scan was centred on the fibre end which had been pre-aligned by the wavefront sensor technqiue. A position of (0,0) corresponds to the intensity at the output end from using the wavefront sensor to align the fibre. The highest intensity obtained was 4095 AU (arbitrary units) located at +0.0130 mm, +0.0270 mm from the origin. In comparison, the intensity at position (0,0) was 2832 AU.

FIG. 7 shows a cross section of intensity through the X-Y plane of the data shown in FIG. 6 at Z=0. The highest intensity (4095 AU) is indicated by the cross 70 and can be seen to be slightly offset from the (0,0) position (2832 AU).

It should be noted that the coupling efficiency of the fibre itself was not under investigation as there are many factors present in the design that affect the coupling efficiency. The incident beam profile was not mode matched to the fibre and the process was not optimised to take into account the pointing direction of the fibre end. A misalignment in the direction of the reference beam would give rise to a non-linear correction factor used in the feedback system of the wavefront sensor system. The current software did not take into account any cross-talk effects of the different modes observed (tip, tilt, defocus) or any non-linearity.

Despite the various approximations, it has been shown that a wavefront sensor can be used to measure the position of the focal waist of a reference beam coming from a fibre, and use this to align a reference beam with the fibre. Such a technique allows the alignment to be carried out with an accuracy of about 30 micron or less. Such an alignment technique would be suitable for integration into a simple control system that allows a fibre to be semi-automatically aligned with an input beam.

Figure 8A:
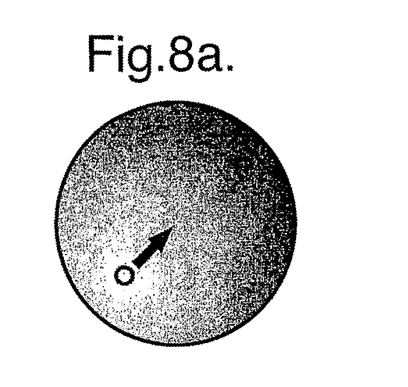
FIG. 8 shows the effect of fibre axis alignment.
Figure 8B:
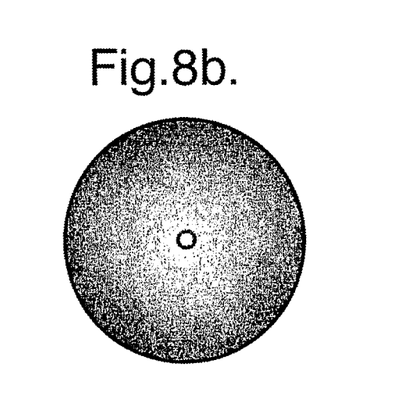

Referring to FIG. 8, the effect of the angular alignment of the optical fibre end is illustrated. FIG. 8a shows the intensity distribution of the first order in off-axis pointing of the fibre. FIG. 8b shows how the central intensity is shifted towards the middle to give on-axis pointing of the fibre.

It should be noted that when the grating-camera system is used as a wavefront sensor (ie exploiting the Greens functions approach) the wavefront sensor can measure the curvature of the wavefront and also the angle of the fibre in the image plane. To align a fibre to achieve efficient coupling, the angle at which the beam enters the fibre is important. If the cleave is flat, the coupling laser would enter and exit the fibre along its axis. Utilising a secondary effect of the distortion grating, the direction of the reference beam from the fibre can be inferred.

The defocused first orders of the beam at the wavefront sensor show the intensity shifting around when the angle of the fibre is changed. The reference beam would be aligned so the highest intensity was in the middle of the +/−1 orders.

Although an example optical layout is described with reference to FIG. 1, the sklled person would appreciate the many types of different optical arrangement that could be used to implement the present invention.

Figure 9:
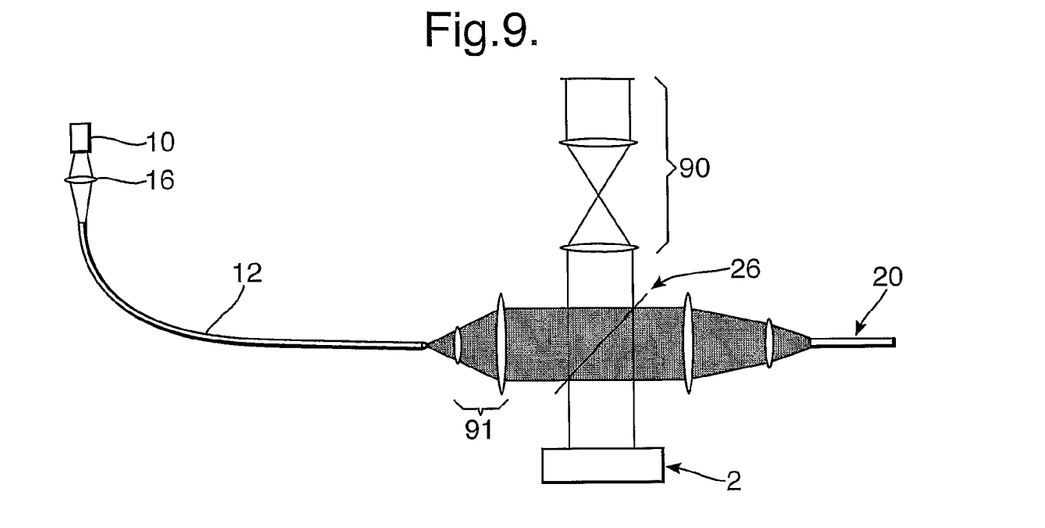
FIG. 9 shows a first alternative optical layout of the present invention.

Referring to FIG. 9, an alternative optical layout is shown. Components shown in FIG. 9 that are equivalent to components shown in FIG. 1 are assigned like reference numerals.

The arrangement shown in FIG. 9 comprises a beam splitter 26, wavefront sensor 2 and a high power laser 20. Focussing optics 91 are provided to couple the high power beam into, and receive the low power reference beam from, the optical fibre 12. It should also be noted that whilst in the system of FIG. 1 the high power laser beam passes through the beam splitter twice before reaching the wavefront sensor (i.e. it is routed via the relay optics comprising the lens 27 and mirror 29), the system shown in FIG. 9 routes the low power reference beam twice through the beam splitter. The relay optics 90 are provided to ensure the additional leg traversed by the lower power beam does not cause any misalignment of the low power beam relative to the wavefront sensor.

Figure 10:
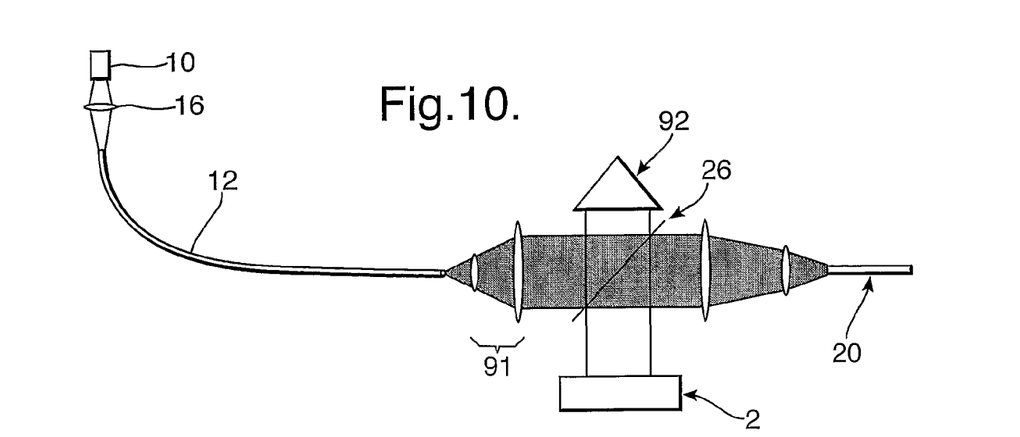
FIG. 10 shows a second alternative optical layout of the present invention.

Referring to FIG. 10, a further system of the present invention is shown. In place of the relay optics 90 shown in FIG. 9, a retro-reflector 92 (e.g. a corner cube) is provided. The retro-reflector ensures that the optical axis of the reference beam incident on the retro-reflector is co-incident with the optical axis of the reference beam reflected from the retro-reflector. In this manner, alignment is maintained.

Further suitable optical arrangements would be immediately apparent to those skilled in the art in light of the teachings contained herein.

The invention claimed is:

1. A method of coupling a first optical beam into a first end of an optical fiber, said method comprising the steps of:
    (i) coupling light into a second end of the optical fiber such that an optical reference beam is output from the first end of the optical fiber; and
    (ii) matching at least one beam parameter of the first optical beam with a corresponding beam parameter of the optical reference beam.

2. A method according to claim 1 wherein the step of (ii) matching at least one beam parameter of the first optical beam with the corresponding beam parameter of the optical reference beam comprises the step of using a beam characterisation sensor to measure at least one beam parameter of the optical reference beam.

3. A method according to claim 2 wherein the step of using a beam characterisation sensor comprises the step of using a wavefront sensor.

4. A method according to claim 1 wherein the step of (ii) matching at least one beam parameter of the first optical beam with the corresponding beam parameter of the optical reference beam comprises the step of using a beam characterisation sensor to measure at least one beam parameter of the first optical beam.

5. A method according to claim 4 wherein the step of (ii) matching at least one beam parameter of the first optical beam with the corresponding beam parameter of the optical reference beam further comprises the step of using the beam characterisation sensor to measure at least one beam parameter of the optical reference beam.

6. A method according to claim 1 wherein the step of (ii) matching at least one beam parameter of the first optical beam with the corresponding beam parameter of the optical reference beam comprises the step of matching the tip/tilt of the first optical beam with the tip/tilt of the reference beam.

7. A method according to claim 1 wherein the step of (ii) matching at least one beam parameter of the first optical beam with the corresponding beam parameter of the optical reference beam comprises the step of laterally aligning the first optical beam with the reference beam.

8. A method according to claim 7 wherein the step of laterally aligning the first optical beam with the reference beam comprises laterally displacing the first end of the optical fiber relative to the first optical beam.

9. A method according to claim 1 wherein the step of (ii) matching at least one beam parameter of the first optical beam with the corresponding beam parameter of the optical reference beam comprises the step of matching the focus of the first optical beam with the focus of the reference beam.

10. A method according to claim 1 wherein the step of (ii) matching at least one beam parameter of the first optical beam with the corresponding beam parameter of the optical reference beam comprises the step of matching the beam curvature of the first optical beam to the beam curvature of the reference beam.

11. A method according to claim 1 wherein the step of (ii) matching at least one beam parameter of the first optical beam with the corresponding beam parameter of the optical reference beam comprises the step of matching the beam waist of the first optical beam with the beam waist of the optical reference beam.

12. An optical apparatus for coupling a first optical beam into a first end of an optical fiber, said apparatus comprises:
means for coupling light into the second end of the optical fiber such that an optical reference beam will be output from the first end of the optical fiber; and
beam matching means for matching at least one beam parameter of the first optical beam with a corresponding beam parameter of the optical reference beam.

13. An apparatus according to claim 12 wherein the beam matching means comprise a beam characterisation sensor.

14. An apparatus according to claim 13 wherein the beam characterisation sensor comprises a wavefront sensor.

15. An apparatus according to claim 14 wherein the wavefront sensor comprises at least one of a distorted grating, a lens and a detector array.

16. An apparatus according to claim 13 and further comprising relay optics that are arranged to direct the reference beam and a portion of the first optical beam to the beam characterisation sensor.

17. An apparatus according to claim 16 wherein the relay optics comprise a beam splitter and a retro-reflector.

18. An apparatus according to claim 12 wherein the optical fiber is a photonic crystal fiber.

19. An optical apparatus for aligning a first end of an optical fiber with a first optical beam, said apparatus comprising:
a primary laser source for producing said first optical beam; and
alignment means for aligning the first end of said optical fiber with the first optical beam, wherein the alignment means comprises at least one wavefront sensor, wherein said alignment means includes a secondary laser source for outputting an optical reference beam optically coupled into a second end of the optical fiber and said wavefront sensor receives the reference beam when the optical reference beam is output from the first end of the optical fiber.

20. An apparatus according to claim 19 wherein the alignment means is arranged to alter the position of the first end of the optical fiber relative to the first optical beam so as to superposition the reference beam and the primary optical beam.

21. An apparatus according to claim 19 wherein the alignment means comprises a translation stage for translating the position of the first end of the optical fiber relative to the first optical beam.

22. An apparatus according to claim 19 wherein the alignment means comprises a moveable stage for altering the angular alignment of the first end of the optical fiber relative to optical axis of the first optical beam.

23. An apparatus according to claim 19 wherein beam shaping means are additionally provided for altering the beam shape of the first optical beam.

24. An apparatus according to claim 19 wherein the primary laser source is a high power laser source.

25. An apparatus for aligning an optical system, the optical system comprising:
a primary laser source coupling a first optical beam into a first end of an optical fiber;
a secondary source of radiation for coupling radiation into a second end of said optical fiber forming an optical reference beam; and
a wavefront sensor for measuring the beam characteristics of both the first optical beam and the optical reference beam.

* * * * *